United States Patent

Withrow et al.

[15] 3,704,765
[45] Dec. 5, 1972

[54] OVERLOAD CLUTCH

[72] Inventors: James Bruce Withrow, Charlotte; Earl William Gardner, Concord, both of N.C.

[73] Assignee: Duff-Norton Company, Inc., Charlotte, N.C.

[22] Filed: July 15, 1971

[21] Appl. No.: 162,943

[52] U.S. Cl. .................................. 188/134, 192/7
[51] Int. Cl. ........................................ F16d 67/00
[58] Field of Search .................... 188/134; 192/7 RR

[56] References Cited

UNITED STATES PATENTS

| | | | |
|---|---|---|---|
| 3,433,332 | 3/1969 | Braun | 188/134 |
| 3,449,978 | 6/1969 | Stimpson | 188/134 X |
| 3,621,958 | 11/1971 | Klemm | 192/8 R |

*Primary Examiner*—Duane A. Reger
*Attorney*—Richards & Shefte, Channing L. Richards, Dalbert U. Shefte and Francis M. Pinckney

[57] ABSTRACT

An overload clutch for a jack mechanism or the like located between a load and a travelling nut and protecting the motor and gearing against excessive torque development by allowing non-operating rotation of the nut when the applied torque exceeds the rotational restraint of the clutch. The clutch comprises a first component connected to the travelling nut through a tubular sleeve and having an axial bore through which a second component extends for non-rotatable attachment to a load therebeyond. The second component has a head on its inner end and a nut between its outer end and the first component, and pairs of Belleville spring washers are arranged in opposing concave face-to-face relation on the second component between the second component head end and the first component and between the nut and the first component, with the nut serving to compress the washers to provide frictional resistance therethrough and thereby apply the rotational restraint of the load to the travelling nut for load manipulating operation of the travelling nut while allowing frictionally resisted relative rotation of the travelling nut when the applied torque exceeds the frictional resistance of the compressed Belleville spring washers.

17 Claims, 5 Drawing Figures

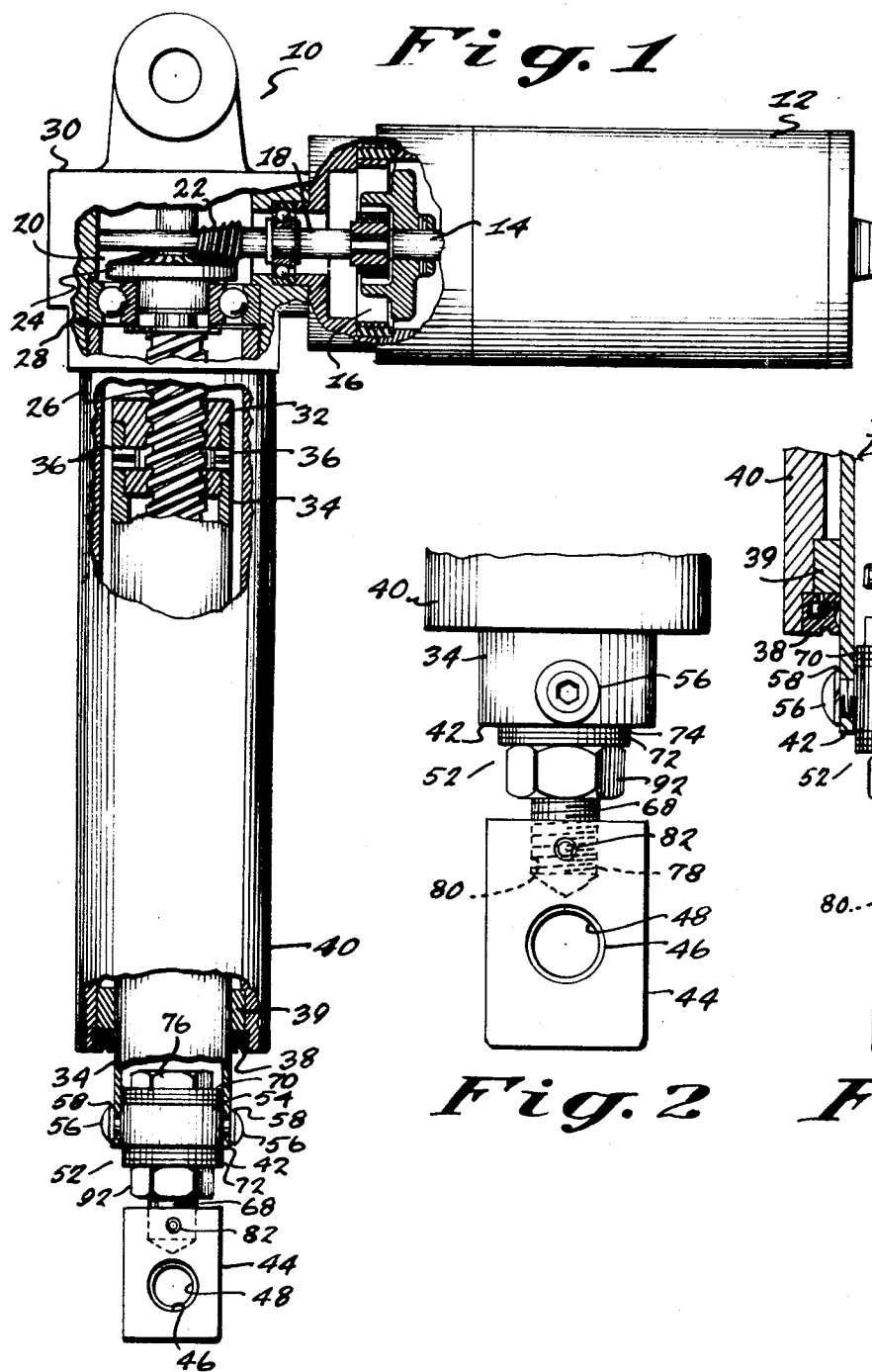

OVERLOAD CLUTCH

BACKGROUND OF THE INVENTION

The present invention relates to an overload clutch, and more particularly to an overload clutch in a jack mechanism or the like wherein the clutch is located beyond the motor and gearing for protection thereof against excessive torque development.

Overload clutches are known to be used in jack mechanisms and the like, particularly in power driven jacks where the clutch protects the motor against overloading. Such clutches are usually somewhat complex and expensive, and are commonly located between the drive motor and the gearing where they are not easily accessible for repair, replacement or adjustment, and do not permit movement of the gearing with respect to the load being manipulated, with the result that the strain of stroke-end bottoming out of the jack mechanism is repeatedly concentrated in the same area of the gearing.

By the present invention, an overload clutch of simple, yet effective and reliable, construction is provided and is particularly adapted for incorporation in a jack mechanism or the like at a location where it not only protects the motor, but also protects the gearing, and is readily accessible for repair, replacement and adjustment, with adjustment being easily accomplished to vary the rotational restraint over a relatively wide range.

SUMMARY OF THE INVENTION

Briefly described, the overload clutch of the present invention is designed for use in a jack mechanism or the like that applies a torque to transform rotational motion into axial motion of an operating member, such as a travelling nut or screw, when the operating member is restrained against rotation and wherein the operating member is capable of non-operating rotation when the applied torque exceeds the restraint, and wherein the operating member is connected to a load attaching member that is non-rotatably attachable to a load to restrain rotational movement of the operating member and thereby cause manipulation of the load by the axial movement of the operating member.

The overload clutch provides the connection between the operating member and the load attaching member and is, therefore, located outwardly of the drive motor and gearing for overload protection of both the drive motor and gearing.

The clutch itself includes a first clutch component secured in axial alignment to the operating member for movement therewith, and a second clutch component axially aligned with the first clutch component and secured to the load attaching member for movement therewith and for support of a load therethrough. Belleville spring washer means are disposed between the clutch components in axial alignment therewith for connection of the operating member and load attaching member therethrough, and means are provided for compressing the Belleville spring washer means between the clutch components to transmit, by the frictional restraint of the compressed Belleville spring washer means, the rotational restraint of the load attaching member to the operating member for non-rotational load manipulating axial movement of the operating member and for allowing frictionally resisted relative rotation of the clutch components for non-operating rotation of the operating member when the applied torque exceeds the frictional restraint of the compressed Belleville spring washer means.

In the preferred embodiment of the present invention, the first clutch component is removably secured in the end of a tubular extension or sleeve of the operating member and has a cylindrical bore extending axially therethrough between axially spaced opposed annular surfaces. The second clutch component has a cylindrical portion that extends rotatably through the bore of the first clutch component and through the Belleville spring washer means, and has one end spaced outwardly from the first clutch component and secured against rotation to the load attaching member and its other end spaced inwardly from the first clutch component and formed with an annular flange larger than the aforesaid bore to provide means for preventing movement in one axial direction through the bore and for cooperating with the compressing means to compress the Belleville spring washer means. With this arrangement the first clutch component is disposed within the axial extent of the second clutch component between the annular flange of the second clutch component and the compressing means.

The Belleville spring washer means is disposed within the axial extent of the second clutch component on the cylindrical portion thereof between the aforesaid annular flange and the compressing means. Preferably, there is a pair of axially aligned Belleville spring washer means or portions, each being an axial series of Belleville spring washers, one between the compressing means and the first clutch component and the other between the aforesaid annular flange and the first clutch component, with a thrust washer disposed between the Belleville spring washers and the adjacent surfaces of the first clutch component to transmit operating forces and rotational restraint therethrough. Each series of Belleville spring washers includes at least, and preferably, one pair of oppositely facing washers disposed with their concave surfaces in face-to-face relation.

The compressing means is preferably an annular member mounted on and secured to the cylindrical portion of the second clutch component axially outward of the Belleville spring washers and disposed thereagainst to compress the washers between the aforesaid annular flange and annular member and against the first clutch member. This annular member is threadably mounted for axial adjustment to vary the compression of the washers and thereby vary the rotational restraint of the clutch beyond which an excessive torque will cause non-operating rotation of the operating member. For convenient access for adjustment, the annular member is disposed outwardly beyond the tubular extension of the operating member.

The location of the overload clutch of the present invention at the operating end of the jack mechanism not only allows for readily accessible repair, replacement and adjustment, but also results in the clutch being outward of both the drive motor and gearing, which is advantageous in preventing overloading and stalling of the motor and wear and damage of the gearing. Protection of the gearing is especially significant where the operating member, which may be a travelling nut or screw, may bottom out at the ends of its stroke, which imposes a concentrated strain at the teeth of the gearing. Without the clutch location of the present invention this bottoming out strain is always concentrated at the same gear teeth area, but with the present invention rotation of the operating member is allowed when bottoming out causes a torque development beyond the rotational restraint imposed by the clutch, which rotation results in a corresponding rotation of the gearing that reorients the gear teeth with respect to the bottoming out position so that upon the next bottoming out another area of the gear teeth may be subjected to the bottoming out strain, thereby avoiding concentration of strain always at only one area.

The use of a series of Belleville spring washers provides desired rotational restraint with a selective range of adjustment and provides such restraint at a plurality of friction interfaces of substantially similar restraining characteristics so that should one interface become roughened or otherwise worn with a resultant increase in frictional resistance the other interface or interfaces will function without substantial change in the restraining characteristic of the clutch, thereby extending the useful life of the clutch. The feature of similar frictional resistance at different interfaces is further enhanced by the preferred concave pairing of the washers by which the radii of the interfaces at the exterior of the washers of each pair are substantially the same. The pairing of the washers with their opposing concave surfaces in face-to-face relation also reduces the sensitivity of adjustment as compared with a parallel washer pairing so that a finer rotational restraint adjustment can be obtained with a given change in adjustment of compression.

The use of two series of Belleville spring washers, one on each side of the first clutch component, provides clutch functioning in either axial direction of loading with substantially the same rotational restraint characteristic.

Further, the arrangement of the Belleville spring washers between the clutch components for transmission of operating forces therethrough allows the jack mechanism to continue to function without the clutch action when desired or when the clutch fails, which continued functioning is obtained simply by tightening the annular compressing member until the clutch is locked in a non-slipping or inoperative condition.

BRIEF DESCRIPTION OF THE DRAWINGS

FIG. 1 is an elevational view, partially in section, of a jack mechanism in which the overload clutch of the preferred embodiment of the present invention is incorporated;

FIG. 2 is an enlarged elevational view of the clutch and associated jack mechanism parts of the construction shown in FIG. 1;

FIG. 3 is an enlarged elevational view, partially in section, of the clutch and associated jack mechanism parts shown in FIG. 2, but viewed at a right angle thereto;

DESCRIPTION OF THE PREFERRED EMBODIMENT

Figure 4:
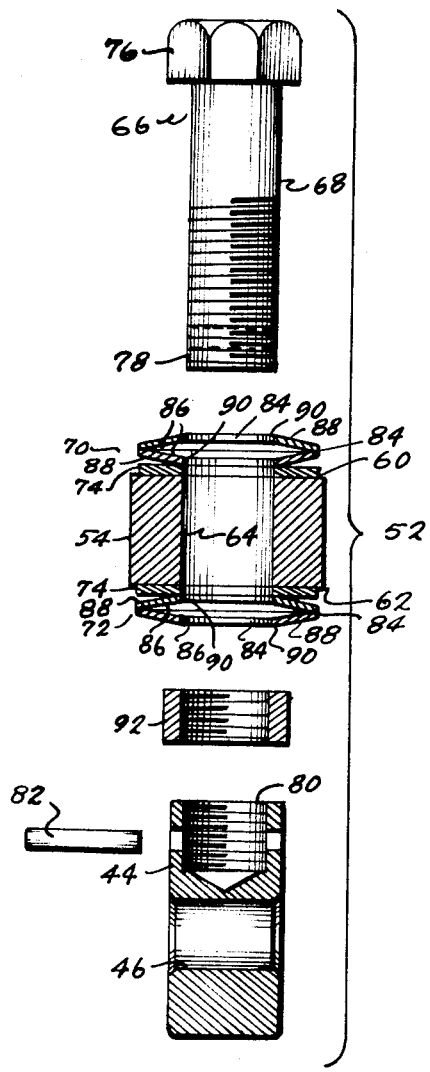
FIG. 4 is an enlarged exploded sectional view of the clutch of the jack mechanism of the preceding figures.

The preferred embodiment of the overload clutch of the present invention is shown in the accompanying drawings incorporated in a self-contained jack mechanism 10 of the type disclosed in Profet U. S. Pat. No. 3,559,499, issued Feb. 2, 1971, and owned by the assignee of the present invention. The illustrated jack mechanism 10 is, for example, used in garden tractors to raise and lower an implement, such as a rotary mower unit, and, therefore, is of relatively small load capacity and requires only relatively low torque capabilities. However, the present invention is applicable to other types of jack mechanisms and the like and is not limited to the load and torque capabilities of the illustrated jack mechanism, which is disclosed for illustrative purposes only.

As disclosed in the aforesaid Profet U. S. Pat. No. 3,559,499, this self-contained jack mechanism 10 includes an electrical motor 12 that drives a shaft 14 to which is connected a self-locking transmission mechanism 16 of the type disclosed in Nestvogel U.S. Pat. No. 3,587,796, issued June 29, 1971, which is also owned by the assignee of the present invention. This self-locking transmission mechanism 16 transmits rotation of the motor shaft 14 to a gearing shaft 18 while locking against attempted overriding, reversing or rundown rotation of the gearing shaft 18 and attached components. The gearing shaft 18 drives the gearing 20, which includes a conical pinion 22 formed on the end of the gearing shaft 18 and drivingly meshing with a spiroid gear 24 that is secured to a jack screw 26 for driving rotation thereof. The jack screw 26 is rotatably mounted in a bearing 28 and is restrained in the housing 30 against axial movement. An operating member, in the form of a travelling nut 32, is threadably mounted on the jack screw 26 for axial movement therealong upon rotation of the jack screw 26, and has a tubular extension or sleeve 34 fixed thereon by pins 36, for rotational and axial movement therewith. The sleeve 34 extends over and outwardly beyond the jack screw 26 through an annular oil seal and wiper assembly 38 mounted in the outer end of a tubular extension 40 of the housing 30, and through an annular guide bushing 39 seated in the outer end of the tubular extension 40 inwardly of the oil seal and wiper assembly 38. The sleeve 34 is connected at its outer end 42 to a load attaching member, in the form of a block 44 having a cylindrical transverse bore 46 in which is seated a tubular bushing 48 for attachment of a load that is to be manipulated by the jack mechanism 10.

With the above-described arrangement of parts, the jack mechanism applies a torque through the shafts 14, 18, gearing 20 and jack screw 26 to transform rotational motion into axial motion of the operating member or nut 32 when the nut is restrained against rotation, and the nut 32 is capable of non-operating rotation when the applied torque exceeds the restraint, with the nut 32 being connected to the load attaching member or block 44 that is non-rotatably attachable to a load to restrain rotational movement of the nut and thereby produce manipulation of the load by axial movement of the nut.

As axial manipulation of the load by the jack mechanism 10 is produced by application of torque, resistance to axial movement due to loading or to bottoming out of the travelling nut 32 inwardly against the bearing 28 or outwardly against the transverse limit pin 50 at the outer end of the jack screw 26 at either end of the stroke of movement of the nut 32 will result in an increase in the applied torque that is attempting to produce axial movement. When this torque becomes excessive, the drive motor 12 may be overloaded or may stall, and excessive strain and wear may be imposed not only on the motor but also on the shafts 14, 18, gearing 20, screw 26 and nut 32.

To avoid such overloading strain of the jack mechanism parts, the overload clutch 52 of the present invention is connected between the load attaching block 44 and the tubular extension 34 of the nut 32.

The clutch 52 includes a first clutch component 54 removably secured by a pair of screws 56 and lock washers 58 in the outer end 42 of the nut sleeve 34 and in axial alignment with the nut 32. This first clutch component 54 has axially spaced opposed annular surfaces 60 and 62 and a cylindrical bore 64 extending axially therethrough.

A second clutch component 66 is axially aligned with the first clutch component 54 and has a cylindrical portion or shank 68 extending rotatably through the bore 64 of the first clutch component 54 and through an inner pair 70 and an outer pair 72 of Belleville spring washers adjacent the opposed inner and outer annular surfaces 60, 62, respectively, of the first clutch member 54, and through thrust washers 74 intermediate the Belleville spring washer pairs and the first clutch component. The inner end of the second clutch component 66 is formed with an annular flange or head 76 that is larger in diameter than the bore 64 in the first clutch component 54 to serve as means for preventing movement of the second clutch component 66 with respect to the first clutch component 54 in one axial direction and to retain the inner pair 70 of Belleville spring washers in place between the head 76 and first clutch component 54. The outer end 78 of the second clutch component 66 is spaced outwardly from the first clutch component 54 and is threaded for attachment in a threaded axial bore 80 in the load attaching block 44, in which it is secured against rotation for movement therewith by a drive pin 82 that extends diametrically through the clutch component 66 and block 44.

Figure 5:
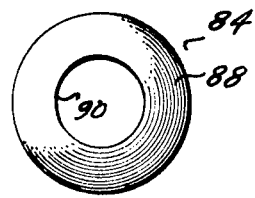
FIG. 5 is a plan view of one of the Belleville spring washers used in the clutch of the preceding figures.

The aforementioned pairs 70 and 72 of Belleville spring washers can be considered to be portions of a total Belleville spring washer means or series, a pair of Belleville spring washer means, or a first and second series of Belleville spring washers. Preferably there is at least one pair of Belleville spring washers disposed between the clutch components, in axial alignment therewith, and in the illustrated embodiment there are two axially aligned pairs 70 and 72 disposed within the axial extent of the second clutch component 66, with the inner pair 70 disposed between the first clutch component 54 and the head 76 of the second clutch component 66 and the outer pair 72 disposed between the first clutch component 54 and the outer end 78 of the second clutch component 66. Each series or pair 70, 72 of Belleville spring washers comprises two oppositely facing Belleville spring washers 84 disposed with their concave surfaces 86 in face-to-face relation. As seen in FIGS. 4 and 5, each Belleville spring washer 84 is frusto-conical in its uncompressed state, having the aforementioned concave surface 86 on one face thereof and a parallel convex surface 88 on its other face, and with a central circular hole 90 of a size that allows sliding extension of the second clutch component shank 68 therethrough.

The Belleville spring washers 84 are compressed between the clutch components 54, 66 to transmit by their frictional resistance the rotational restraint of the load attaching block 44 for non-rotational load manipulating axial movement of the travelling nut 32 and allowing resisted relative rotation of the clutch components 54, 66 for non-operating rotation of the travelling nut 32 when the torque applied through the jack mechanism 10 exceeds the frictional restraint of the Belleville spring washers 84. The means for accomplishing this compression is, in the illustrated embodiment, an annular member, in the form of a clutch nut 92, mounted on and secured to the shank 68 of the second clutch component 66 axially outward of the outer series or pair 72 of Belleville spring washers 84 and disposed thereagainst to compress both series or pairs of washers between the second clutch member head 76 and clutch nut 92 and against the opposed surfaces 60, 62 of the first clutch component 54. The head 76 of the second clutch components 66 thus cooperates with the clutch nut 92 to compress the Belleville spring washers 84, with the first clutch component 54 disposed within the axial extent of the shank 68 of the second clutch component 66 and between the head 76 and clutch nut 92.

The clutch nut 92 is interiorly threaded for engagement with the threads on the shank 68 to provide for axially adjustable movement of the shank 68 to vary the compression of the Belleville spring washers 84 and thereby vary the rotational restraint beyond which an excessive torque development in the jack mechanism 10 will cause non-operating rotation of the travelling nut 32. As seen in FIGS. 1, 2 and 3, the clutch nut 92 is disposed outwardly beyond the outer end 42 of the tubular sleeve 34 so that it is easily accessible for adjustment.

In addition to being easily accessible for adjustment, the clutch 52 of the illustrated embodiment is easily accessible for repair or replacement as it is located at the outer end of the jack mechanism 10 beyond the tubular extension 40 of the housing 30, with the attaching screws 56 exposed. The clutch 52 is removed simply by removing the screws 56 and drive pin 82, and unscrewing the shank 68 of the second clutch component 66 from the load attaching block 44. The removed clutch 52 can then be easily disassembled simply by unscrewing the clutch nut 92 from the shank 68 and sliding all of the other parts off the shank 68.

To assemble the clutch 52 and connect it in the jack mechanism 10, the second clutch component 66 serves as the base element on which the other elements are assembled. Assembly is accomplished by sliding in order onto the shank 68 of the second clutch component 66 the inner pair 70 of Belleville spring washers 84, one of the thrust washers 74, the first clutch component 54, the other thrust washer 74, and the outer pair 72 of Belleville spring washers. The clutch nut 92 is then screwed onto the shank 68 and tightened against the outer pair 72 of washers to compress the entire series of washers against the head 76 of the second clutch component 66 with the first clutch component 54 disposed intermediate the washers and, therefore, also having the washers compressed thereagainst at both opposing annular surfaces 60, 62 thereof. The clutch nut 92 is tightened to an extent that provides desired clutch capacity, and the load attaching block 44 is then connected by screwing the threaded outer end 78 of the shank 68 into the threaded bore 80 of the block 44 and seating the drive pin 82 in the shank 68 and block 44 to lock them together. Finally, the clutch 52 is connected to the jack mechanism 10 by seating it within the sleeve 34 extending from the travelling nut 32 and running the screws 56 through the sleeve 34 into the first clutch component 54 to secure these parts together. At any time after the clutch 52 has been connected in the jack mechanism 10, it can be readily adjusted to vary its rotational restraint capacity simply by engaging and tightening or loosening the clutch nut 92, which is conveniently exposed outwardly of the sleeve 34 for this purpose.

During normal operation of the jack mechanism 10, within the adjusted rotational restraint capacity of the overload clutch 52, the clutch serves simply as a fixed connection between the travelling nut 32 and load attaching block 44 to transmit axial load manipulating movement, but when the travelling nut 32 bottoms out at either end of its operating stroke or when an excessive load is imposed, resulting in an increase in the torque required to produce axial movement, the limited rotational restraint of the clutch 52 may be overcome by the increased torque to allow non-operating rotation of the travelling nut 32 without excessive torque development, thereby avoiding overloading or stalling of the drive motor 12 and excessive strain on the various parts of the jack mechanism 10.

As the overload clutch 52 is located outwardly beyond the gearing 20, the gearing will rotate when the travelling nut 32 rotates, which is particularly significant when the nut 32 has bottomed out as the rotation of the gearing 20 will change the area of gear teeth engagement in relation to bottoming out so that the bottoming out strain on the gear teeth will not always occur at the same gear teeth area, thereby increasing the useful wear life of the gearing 20 as compared with a jack mechanism that has no overload clutch or has an overload clutch located in a conventional manner between the gearing and power source so that the strain of bottoming out is always concentrated at the same gear teeth area.

The use of inner and outer pairs 70, 72 of Belleville spring washers 84 on opposite sides of the first clutch component 54 provides a similar load transmitting connection at substantially the same rotational restraint capabilities in either axial direction of loading. Also, this use of a plurality of Belleville spring washers 84 provides rotational restraint at a plurality of friction interfaces of substantially similar rotation restraining characteristics so that should one interface become roughened or otherwise worn with a resultant increase in friction resistance another of the interfaces will provide clutch functioning without substantial change in the overall restraining characteristic of the clutch, thereby extending the useful life of the clutch. This advantage of similar frictional resistance at different interfaces is further enhanced by the above-described concave surface 86 pairing of the Belleville spring washers 84 of each pair 70, 72, by which the radii of the interfaces at the exterior of the washers of each pair are substantially the same. This concave surface pairing is particularly significant in providing reliable and consistent functioning at a desired adjusted rotational restraint level. Also, the concave surface pairing reduces the sensitivity of adjustment in varying the rotational restraint of the clutch as a greater movement of the clutch nut 92 to obtain a desired change in rotational restraint is possible for finer adjustment, as compared with an arrangement of washers in parallel. However, a parallel arrangement could be used where fine adjustment is not important and where the greater rotational restraint possible with a parallel arrangement is desired.

In some applications where clutch action is not important or desired or where the clutch has failed for one reason or another, the clutch 52 can be rendered inoperative without having to remove it from the jack mechanism 10. This can be done simply by tightening the clutch nut 92 sufficiently to impose a great enough rotational restraint to withstand any possible torque that may be developed in the jack mechanism 10.

Another significant aspect of the above-described clutch 52 is its simplicity of construction, which utilizes a small number of simple and inexpensive parts in an easily and inexpensively produced assembly that functions simply and reliably to provide limited rotational restraint.

Although the overload clutch 52 illustrated and described hereinabove in detail is the preferred embodiment for the application described, it should be understood that the construction, arrangement, and application are capable of variation within the scope of the present invention, which is intended to be limited only by the scope of the appended claims and equivalents thereof. For example, the number and disposition of the Belleville spring washers 84 may be varied or may be arranged in parallel rather than in concave facing relation or may be located on only one side of the first clutch component 54; equivalents of Belleville washers, such as flat coil springs or similar means, may be utilized; the clutch nut 92 may be secured other than by threads or may not be adjustable or may be combined with the load attaching block 44 as an integral member; and the clutch may be attached to the jack screw of a travelling screw type jack mechanism or may be incorporated in other types of machanisms where a clutch of this type would be advantageous.

We claim:

1. An overload clutch for use in a jack mechanism or the like that applies a torque to transform rotational motion into axial motion of an operating member when the operating member is restrained against rotation and wherein the operating member is capable of non-operating rotation when the applied torque exceeds the restraint, the operating member being connected to a load attaching member that is non-rotatably attachable to a load to restrain rotational movement of the operating member and thereby produce manipulation of the load by axial movement of said operating member, said overload clutch comprising a first clutch component secured in axial alignment to said operating member for movement therewith, a second clutch component axially aligned with said first clutch component and secured to said load attaching member for movement therewith, Belleville spring washer means disposed between said clutch components in axial alignment therewith, said clutch components and Belleville spring washer means providing the aforesaid connection between said operating member and said load attaching member, and means compressing said Belleville spring washer means between said clutch components to transmit therethrough by the frictional resistance of said Belleville spring washer means the rotational restraint of said load attaching member to said operating member for nonrotational load manipulating axial movement of said operating member and for allowing frictionally resisted relative rotation of said clutch components for non-operating rotation of said operating member when the applied torque exceeds the frictional restraint of said compressed Belleville spring washer means.

2. An overload clutch according to claim 1 and characterized further in that said compressing means is adjustable to vary the compression of said Belleville spring washer means and thereby vary the rotational restraint beyond which an excessive torque will cause non-operating rotation of said operating member.

3. An overload clutch according to claim 1 and characterized further in that said Belleville spring washer means includes an axial series of Belleville spring washers.

4. An overload clutch according to claim 3 and characterized further in that said series of Belleville spring washers includes at least one pair of oppositely facing Belleville spring washers.

5. An overload clutch according to claim 1 and characterized further in that one of said clutch components is disposed withing the axial extent of the other of said clutch components, and said Belleville spring washer means is disposed within the axial extent of said other clutch component.

6. An overload clutch according to claim 5 and characterized further by a pair of said Belleville spring washer means disposed in axial alignment within the extent of said other clutch component and with said one clutch component between the Belleville spring washer means of said pair, and said compressing means compresses both Belleville spring washer means between said clutch components.

7. An overload clutch according to claim 1 and characterized further in that one of said clutch components has a bore extending axially therethrough, the other of said clutch components extends rotatably through the bore in said one clutch component and through said Belleville spring washer means and has means thereon for preventing movement of said one clutch component with respect to said other clutch component in one axial direction and cooperating with said compressing means to compress said Belleville spring washer means.

8. An overload clutch according to claim 7 and characterized further in that said compressing means is mounted on said other clutch component with said Belleville spring washer means and said one clutch member disposed between said movement preventing means and said compressing means.

9. An overload clutch according to claim 8 and characterized further in that said compressing means is axially adjustable on said one clutch component to vary the compression of said Belleville spring washer means and thereby vary the rotational restraint beyond which an excessive torque will cause non-operating rotation of said operating member.

10. An overload clutch according to claim 8 and characterized further in that said Belleville spring washer means is disposed with a portion thereof between said compressing means and said one clutch member and a portion thereof between said movement preventing means and said one clutch member.

11. An overload clutch according to claim 10 and characterized further in that each portion of said Belleville spring washer means includes at least one pair of oppositely facing Belleville spring washers.

12. An overload clutch according to claim 1 and characterized further in that said first clutch component has axially spaced opposed annular surfaces and a cylindrical bore extending axially therethrough, said second clutch component has a cylindrical portion extending rotatably through the bore of said first clutch component and having one of its ends spaced outwardly from said first clutch component and secured against rotation to said load attaching member and its other end spaced inwardly from said first clutch component and formed with an annular flange larger than the bore in said first clutch component, said Belleville spring washer means is disposed on said cylindrical portion of said second clutch component and includes a first axial series of Belleville spring washers disposed between said annular flange and the adjacent surface of said first clutch component and a second axial series of Belleville spring washers disposed between said one end of said second clutch component and the adjacent surface of said first clutch component, and said compressing means includes an annular member mounted on and secured to said cylindrical portion of said second clutch component axially outward of said second series of Belleville spring washers and disposed thereagainst to compress said Belleville spring washers between said annular flange and annular member and against said first clutch component.

13. An overload clutch according to claim 12 and characterized further in that said annular member is threadably mounted on said cylindrical portion of said second clutch component for axial adjustment thereon to vary the compression of said Belleville spring washers and thereby vary the rotational restraint beyond which an excessive torque will cause non-operating rotation of said operating member.

14. An overload clutch according to claim 12 and characterized further in that said Belleville spring washer means includes a thrust washer disposed between each series of Belleville spring washers and the adjacent surface of said first clutch component to transmit operating forces and rotational restraint therethrough.

15. An overload clutch according to claim 12 and characterized further in that each series of Belleville spring washers comprises a pair of oppositely facing Belleville spring washers disposed with concave surfaces in face-to-face relation.

16. An overload clutch according to claim 12 and characterized further in that said first clutch component is removably secured in the end of a tubular extension of said operating member and said second clutch member extends outwardly beyond said tubular extension.

17. An overload clutch according to claim 16 and characterized further in that said annular member of said compressing means is axially adjustable on said cylindrical portion of said second clutch component to vary the compression of said Belleville spring washers and is disposed outwardly beyond said tubular extension, thereby being easily accessible for adjustment thereof.

* * * * *